United States Patent
Shamouilian et al.

(12) 
(10) Patent No.: US 6,689,252 B1
(45) Date of Patent: Feb. 10, 2004

(54) ABATEMENT OF HAZARDOUS GASES IN EFFLUENT

(75) Inventors: Shamouil Shamouilian, San Jose, CA (US); Tony S. Kaushal, Cupertino, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/363,250

(22) Filed: Jul. 28, 1999

(51) Int. Cl.[7] .............................. B01J 19/08; A62D 3/00
(52) U.S. Cl. .................. 204/157.15; 422/174; 422/186; 423/210; 423/240 R; 423/245.1; 588/207
(58) Field of Search .............................. 423/210, 240 R, 423/245.1; 588/206, 207, 205; 204/157.15; 422/174, 186

(56) References Cited

U.S. PATENT DOCUMENTS

| | | | |
|---|---|---|---|
| 2,819,151 A | 1/1958 | Flemmert | 23/182 |
| 3,203,759 A | 8/1965 | Flemmert | 23/182 |
| 3,969,482 A | 7/1976 | Teller | 423/235 |
| 3,969,485 A | 7/1976 | Flemmert | 423/337 |
| 3,983,021 A | 9/1976 | Henis | 204/164 |
| 4,206,189 A | 6/1980 | Kosintsev et al. | 423/336 |
| 4,479,443 A | 10/1984 | Faldt et al. | 110/346 |
| 4,735,633 A | 4/1988 | Chiu | 55/2 |
| 4,753,915 A | 6/1988 | Vogt et al. | 502/304 |
| 4,788,036 A | 11/1988 | Eiselstein et al. | 420/448 |
| 4,954,320 A | 9/1990 | Birmingham et al. | 422/186.04 |
| 4,966,611 A | 10/1990 | Schumacher et al. | 55/20 |
| 5,137,701 A | 8/1992 | Mundt | 423/210 |
| 5,151,116 A | 9/1992 | Scholz et al. | 55/387 |
| 5,176,897 A | 1/1993 | Lester | 423/659 |
| 5,187,344 A | 2/1993 | Mizuno et al. | 219/121.5 |

(List continued on next page.)

FOREIGN PATENT DOCUMENTS

| | | |
|---|---|---|
| DE | 215706 | 11/1984 |
| DE | 3642472 | 12/1986 |
| DE | 4319118 | 6/1993 |
| DE | 19526737 | 1/1997 |
| DE | 19738038 | 8/1997 |
| EP | 0424966 | 10/1989 |
| EP | 0544480 | 6/1993 |
| EP | 0885648 A | 12/1993 |
| EP | 0778070 | 12/1995 |
| EP | 09166388 A | 5/1999 |
| EP | 0269720 | 12/1999 |
| JP | 51129868 | 11/1976 |
| JP | 5845718 | 3/1983 |
| JP | 39768 | 2/1991 |
| JP | 10192653 | 7/1998 |
| JP | 11070322 | 3/1999 |
| JP | 11319485 | 11/1999 |
| WO | 9419090 | 9/1994 |
| WO | WO 96/61132 | 2/1999 |

OTHER PUBLICATIONS

PCT Communication dated Mar. 13, 2001.
U.S. patent application Publication No. 2002/0150527, published Oct. 17, 2002.
U.S. patent application Publication No. 2001/0031228, published Oct. 18, 2001.

Primary Examiner—Wayne A. Langel
Assistant Examiner—Jonas N. Strickland
(74) Attorney, Agent, or Firm—Janah & Associates (57) ABSTRACT

An apparatus and method for reducing hazardous gases exhausted from a process chamber 25 includes an effluent plasma reactor 210 and a downstream catalytic reactor 220. The reactor 210 may include a consumable liner that reacts with the energized effluent to remove the hazardous gases. The catalytic reactor 220 may also include catalytic surfaces 227 in a honeycomb, foam, or pellet structure 225 to catalyze reactions that further reduce hazardous gas content.

89 Claims, 6 Drawing Sheets

U.S. PATENT DOCUMENTS

| | | | | |
|---|---|---|---|---|
| 5,191,184 A | | 3/1993 | Shin | 219/10.55 R |
| 5,207,836 A | | 5/1993 | Chang | 134/1 |
| 5,417,934 A | | 5/1995 | Smith et al. | 422/177 |
| 5,439,568 A | | 8/1995 | Uchiyama | 204/164 |
| 5,453,125 A | | 9/1995 | Krogh | 118/723 MR |
| 5,510,066 A | | 4/1996 | Fink et al. | 264/40.1 |
| 5,584,959 A | | 12/1996 | Kimura et al. | 156/345 |
| 5,589,148 A | * | 12/1996 | Otsuka et al. | 423/240 S |
| 5,597,540 A | * | 1/1997 | Akita et al. | 423/241 |
| 5,643,545 A | * | 7/1997 | Chen et al. | 243/245.3 |
| 5,649,985 A | | 7/1997 | Imamura | 55/222 |
| 5,663,476 A | | 9/1997 | Cripe et al. | 588/228 |
| 5,720,444 A | | 2/1998 | Wheeler et al. | 242/364.1 |
| 5,720,931 A | | 2/1998 | Rossin et al. | 423/236 |
| 5,746,984 A | | 5/1998 | Hoard | 422/169 |
| 5,762,893 A | | 6/1998 | Scholz et al. | 423/240 S |
| 5,779,863 A | | 7/1998 | Ha et al. | 203/74 |
| 5,785,741 A | | 7/1998 | Li et al. | 96/4 |
| 5,788,778 A | | 8/1998 | Shang et al. | 134/1 |
| 5,817,284 A | * | 10/1998 | Nakano et al. | 423/240 S |
| 5,830,328 A | | 11/1998 | Uhm | 204/164 |
| 5,843,239 A | | 12/1998 | Shrotriya | 134/1.1 |
| 5,843,288 A | | 12/1998 | Yamamoto | 204/164 |
| 5,858,065 A | | 1/1999 | Li et al. | 95/45 |
| 5,865,879 A | | 2/1999 | Lee | 95/273 |
| 5,914,091 A | | 6/1999 | Holst et al. | 422/173 |
| 5,919,285 A | * | 7/1999 | Li et al. | 95/45 |
| 5,927,069 A | | 7/1999 | Wang et al. | 60/275 |
| 5,955,037 A | | 9/1999 | Holst et al. | 422/171 |
| 5,965,786 A | * | 10/1999 | Rostaing et al. | 588/210 |
| 5,977,427 A | | 11/1999 | Tamata et al. | 588/206 |
| 6,007,742 A | * | 12/1999 | Czernichowski et al. | 252/372 |
| 6,009,827 A | | 1/2000 | Robles et al. | 118/723 R |
| 6,013,584 A | | 1/2000 | M'Saad et al. | 438/783 |
| 6,030,591 A | * | 2/2000 | Tom et al. | 423/240 |
| 6,069,291 A | | 5/2000 | Rossin et al. | 588/206 |
| 6,095,084 A | * | 8/2000 | Shamouilian et al. | 118/723 |
| 6,185,839 B1 | * | 2/2001 | Kholodenko et al. | 34/255 |
| 6,187,072 B1 | | 2/2001 | Cheung et al. | 55/186 |
| 6,190,507 B1 | * | 2/2001 | Whealton et al. | 204/157.3 |
| 6,322,756 B1 | | 11/2001 | Arno et al. | 422/171 |
| 6,426,443 B1 | | 7/2002 | Rossin et al. | 588/206 |
| 6,509,511 B1 | | 1/2003 | Rossin | 588/205 |

* cited by examiner

ABATEMENT OF HAZARDOUS GASES IN EFFLUENT

BACKGROUND

The present invention is related to an apparatus and method for reducing a hazardous gas content of an effluent from a process chamber.

Fluorocarbon, chlorofluorocarbons, hydrocarbon, and other fluorine containing gases are widely used in the manufacture of integrated circuits in process chambers. These gases are chemically toxic to humans and hazardous to the environment. In addition, they may also strongly absorb infrared radiation and have high global warming potentials. Especially notorious are persistent fluorinated compounds or perfluorocompounds (PFCs) which are long-lived, chemically stable compounds that have lifetimes exceeding thousands of years. Some examples of PFCs are carbon tetrafluoride ($CF_4$), hexafluoroethane ($C_2F_6$), perafluoropropane ($C_3F_8$), trifluoromethane ($CHF_3$), sulfur hexafluoride ($SF_6$), nitrogen trifluoride ($NF_3$), carbonyl fluoride ($COF_2$) and the like. For example, $CF_4$ has a lifetime in the environment of about 50,000 years and can contribute to global warming for up to 6.5 million years. Thus it is desirable to have an apparatus or method that can reduce the hazardous gas content of effluents, and especially PFC's, that may be released from the process chambers.

Perfluorocompounds are utilized in numerous semiconductor fabrication processes. For example, perfluorocompounds are used in the etching of layers on substrates, such as oxide, metal and dielectric layers. Perfluorocompounds can also be used during chemical vapor deposition processes. Additionally, process chambers can be cleaned of etch or deposition residue using perfluorocompounds. These hazardous compounds are either introduced into a process chamber or are formed as byproducts within the process chamber and may be exhausted from the chamber in an effluent gas stream.

It is necessary for the health of our environment to minimize the introduction of harmful gases and byproducts into atmosphere. There is also a need to minimize the harmful content of the effluent gas in an efficient and inexpensive manner. There is a further need to reduce PFC and other harmful gases to the lowest possible levels especially for industries which widely use PFCs, even though such use is a relatively small component of the overall consumption or release of PFCs in the world.

SUMMARY

The present invention reduces a content of hazardous gases, such as PFCs, in a simple and efficient manner. The present invention is useful for reducing the hazardous gas content of effluent gas resulting from processing of substrates, such as semiconductor wafers and other electronic devices. By hazardous gas it is meant any toxic, harmful or undesirable gas, such as, but not limited to PFCs, CFCs, hydrocarbons, other fluorine containing gases, and other undesirable gases.

In one aspect of the invention, a gas treatment apparatus for reducing a hazardous gas content of an effluent from a chamber comprises a reactor adapted to receive the effluent, the reactor including a consumable material capable of reacting with the effluent to remove hazardous gas therefrom, and a gas energizer adapted to energize the effluent in the reactor.

In another aspect of the invention, a gas treatment apparatus for reducing a hazardous gas content of an effluent from a chamber comprises a reactor adapted to receive the effluent, the reactor including a dielectric interior surface capable of reacting with the effluent to remove hazardous gas therefrom and a gas energizer adapted to energize the effluent in the reactor.

In another aspect of the invention, a method of treating an effluent from a chamber to reduce the hazardous gas content therein comprises introducing effluent gas into a reactor, introducing an oxygen containing gas into the reactor, and energizing the effluent and oxygen containing gases in the reactor to reduce the hazardous gas content therein.

In another aspect of the invention, a gas treatment apparatus for reducing hazardous gas content of an effluent from a chamber comprises a gas reactor adapted to receive the effluent and a gas energizer adapted to energize the effluent in the reactor, and a catalytic reactor adapted to catalyze reactions in the effluent to reduce the hazardous gas content thereof.

In another aspect of the invention, a method of treating an effluent to reduce the hazardous gas content thereof comprises introducing effluent gas into a gas reactor and energizing the effluent gas in the gas reactor, and introducing the effluent gas into a catalytic reactor to catalyze reactions in the effluent gas whereby the hazardous gas content of the effluent gas is reduced. The steps may occur in any order.

In another aspect of the invention, a method of reducing recombination of radicals into hazardous gases comprises inductively heating hazardous gas to form inductively heated radicals and introducing the inductively heated radicals into a catalytic reactor to catalyze favorable reactions and thereby reduce hazardous gas recombination.

In another aspect of the invention, a method of treating an effluent from a process chamber to reduce the hazardous gas content thereof comprises introducing effluent gas from a process chamber into a catalytic reactor at a temperature below about 400° C., and passing the effluent gas through the catalytic reactor to catalyze reactions in the effluent and thereby reduce the hazardous gas content thereof.

DRAWINGS

These features, aspects, and advantages of the present invention will become better understood with regard to the following description, appended claims, and accompanying drawings which illustrate examples of the invention, where:

DESCRIPTION

The present invention relates to a gas treatment apparatus for use with a semiconductor process chamber and a method for abatement of a hazardous gas content of effluent gas from a process chamber. The foregoing description and accompanying drawings represent illustrative embodiments of the invention and are not intended to limit the invention. Thus, while the description and drawings illustrate exemplary features of the invention, it is to be understood that each of the features can be used in the invention in general, not merely in the context of the particular drawings, and the invention includes any combination of these features.

Figure 1:
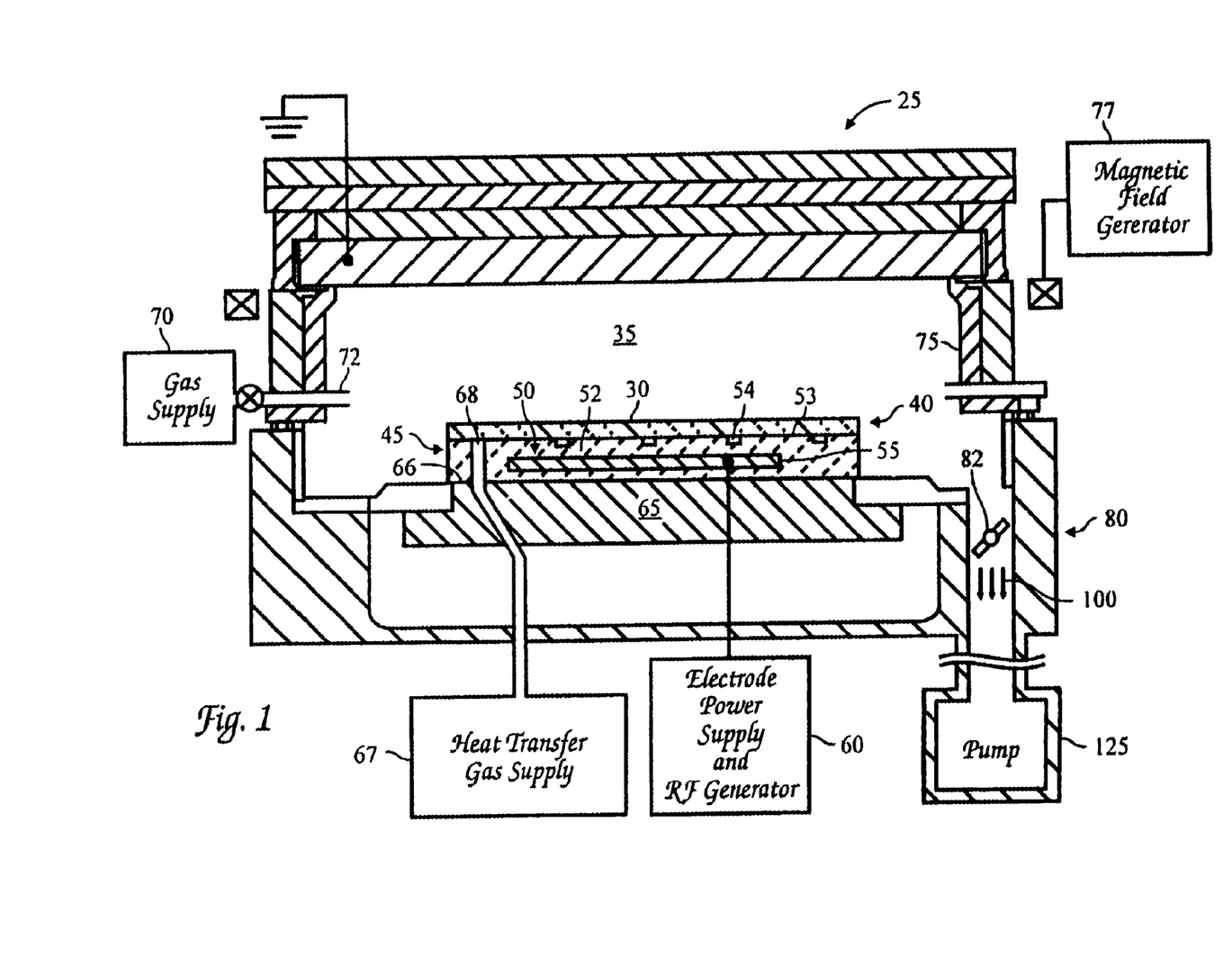
FIG. 1 is a schematic sectional side view of an exemplary semiconductor processing apparatus for processing a substrate and which produces effluent containing hazardous gases.

An exemplary semiconductor processing apparatus, as illustrated in FIG. 1, comprises a chamber 25 for example, an MxP+OXIDE ETCH chamber, commercially available from Applied Materials Inc., Santa Clara, Calif., and generally described in commonly assigned U.S. Pat. Nos. 4,842,683 and 5,215,619 to Cheng, et al; and U.S. Pat. No. 4,668,338 to Maydan, et al., all of which are incorporated herein by reference. Such chambers can be used in a multi-chamber integrated process system as for example, described in U.S. Pat. No. 4,951,601 to Maydan, et al., which is also incorporated herein by reference. The particular embodiment of the chamber 25 shown herein, is suitable for processing of semiconductor substrates 30. The embodiment is provided only to illustrate the invention, and should not be used to limit the scope of the invention.

During processing, the chamber 25 is evacuated to a low pressure of less than about 500 mTorr, and a substrate 30 is transferred to a plasma zone 35 of the chamber 25 from a load lock transfer chamber (not shown) maintained at vacuum. The substrate 30 is held on a support 40, which optionally comprises a mechanical or electrostatic chuck 45. A typical electrostatic chuck 45 comprises an electrostatic member 50 comprising a dielectric layer 52 having a surface 53 adapted to receive the substrate 30. The surface 53 may have grooves 54 in which a heat transfer gas, such as helium, is held to control the temperature of the substrate 30. The dielectric layer 52 covers an electrode 55—which may be a single conductor or a plurality of conductors—which is chargeable to electrostatically hold the substrate 30. After the substrate 30 is placed on the chuck 45, the electrode 55 is electrically biased with respect to the substrate 30 by an electrode voltage supply and generator 60 to electrostatically hold the substrate 30. A base 65 below the electrostatic chuck 45 supports the chuck, and optionally, is also electrically biased with an RF bias voltage.

Heat transfer gas may be provided during processing of the substrate 30 to the interface between the substrate 30 and the dielectric layer 52 of the chuck 45, to enhance heat transfer rates therebetween. The heat transfer gas is provided via gas conduits 66 that extend through one or more of the electrodes 55 and dielectric layer 52. A heat transfer gas supply 67 supplies heat transfer gas to the conduits 66 via a gas supply channel. The conduits 66 have one or more outlets 68 that deliver the gas to the surface 53 of the chuck 45. The substrate 30 covers the edges of the dielectric layer 52 to reduce leakage of heat transfer gas from the edge of the chuck 45. The grooves 54 on the surface 53 of the dielectric layer 52 are sized and distributed to hold heat transfer gas to heat or cool substantially the entire backside of the substrate 30, such as for example, a pattern of intersecting grooves 54 radiating across the dielectric layer 52. Preferably, at least one conduit 66 terminates in one of the grooves 54, and more preferably, the conduits 66 terminate at one or more intersections of the grooves 54. Alternative groove patterns are described in, for example, U.S. patent application Ser. No. 08/189,562, entitled "Electrostatic Chuck" by Shamouilian, et al., filed on Jan. 31, 1994, which is incorporated herein by reference. The gas conduits 66, gas supply channel, and grooves 54 are formed by conventional techniques, such as drilling, boring, or milling. Typically, the heat transfer gas comprises helium or argon which is supplied at a pressure of about 5 to about 30 Torr; however, other gases such as $CF_4$ can also be used.

Process gas is introduced into the chamber 25 through a gas supply that includes a first gas supply 70 and one or more gas nozzles 72 terminating in the chamber 25. The gas in the chamber 25 is typically maintained at a low pressure. A plasma is formed in the plasma zone 35 from the gas by applying an RF or electromagnetic current to an inductor coil (not shown) encircling the process chamber and/or by applying an RF current to the electrode 55 in the chamber 25. In etching processes, the plasma is typically capacitively generated by applying an RF voltage to the electrode 55 (which serves as the cathode electrode) and by electrically grounding the sidewalls 75 of the chamber 25 to form the other (anode) electrode 55. Alternatively, an RF current is applied to an inductor coil (not shown) to inductively couple energy into the chamber 25 to generate the plasma in the plasma zone 35. The frequency of the RF current applied to the electrode 55 or to the inductor coil (not shown) is typically from about 50 KHz to about 60 MHz, and more typically about 13.56 MHz.

The plasma can also be enhanced by electron cyclotron resonance in a magnetically enhanced reactor in which a magnetic field generator 77, such as a permanent magnet or electromagnetic coils, provides a magnetic field that increases the density and uniformity of the plasma in the plasma zone 35 especially in capacitively coulped system as shown in FIG. 1. Preferably, the magnetic field comprises a rotating magnetic field with the axis of the field rotating parallel to the plane of the substrate 30, as described in U.S. Pat. No. 4,842,683. Effluent 100 comprising process gas and process byproducts is exhausted from the chamber 25 through an exhaust system 80 capable of achieving a minimum pressure of about $10^{-3}$ mTorr in the chamber 25. The exhaust system 80 comprises an exhaust tube 85 that leads to one or a plurality of pumps 125, such as roughing and high vacuum pumps, that evacuate the gas in the chamber 25. A throttle valve 82 is provided in the exhaust tube 85 for controlling the pressure of the gas in the chamber 25. Also, an optical endpoint measurement technique is often to determine completion of the etching process by measuring a change in light emission intensity of a gas species in the chamber 25 or measuring the intensity of light reflected from a layer being processed on the substrate 30.

Figure 2:
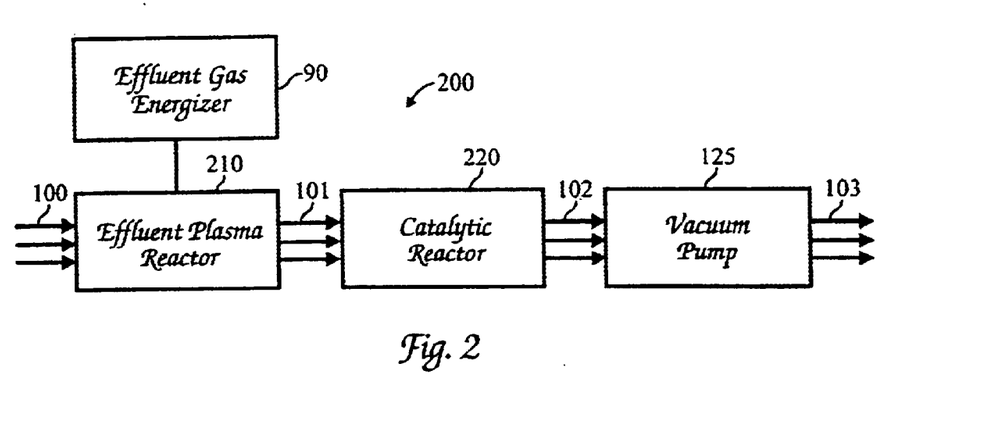
FIG. 2 shows a schematic diagram of an embodiment of an effluent gas treatment apparatus of the present invention.

The effluent gas 100 from the process chamber 25 contains numerous toxic and hazardous elements, particularly fluorocarbons, chlorofluorocarbons, hydrocarbons, and other fluorine containing gases and PFCs. The effluent gas 100 is delivered via the exhaust tube 85 to a gas treatment apparatus 200, as shown in FIG. 2. The gas treatment apparatus includes an effluent plasma reactor 210 and a catalytic reactor 220 that receives effluent 101 that has been treated in the effluent plasma reactor 210. The catalytic reactor 220 further treats the effluent. The effluent 102 that leaves the catalytic reactor is substantially abated of hazardous gas and is then able to be safely exhausted 103.

A gas energizer 90 such as an electromagnetic energy coupling system, such as a pair of facing electrodes or an inductor coil, or a microwave generator, energizes the effluent gas in the effluent plasma reactor 210. For example, in the embodiment shown in FIG. 3, the gas energizer 90 comprises an electromngetic energy coupling system comprising an RF source, an RF match network, and an inductor coil 132 to energize and dissociate the effluent to reduce the hazardous gas content of the effluent. The configuration of the plasma reactor 210 and the gas energizer 90 complement one another to maximize the energy applied to the effluent in the exhaust tube, and to allow the effluent to flow through the reactor tube in a continuous stream of effluent, as described below. Plasma reactor 210 and exhaust tube 85 need not be separate parts as will be discussed below. The effluent gas may be energized within the exhaust tube 85 and the exhaust tube itself may serve as the plasma reactor 210. The term "plasma reactor" is used herein for clarity. It is to be recognized that the reactor is not limited to generating plasmas, but rather can represent any energized or activated gas reactor.

Figure 3:
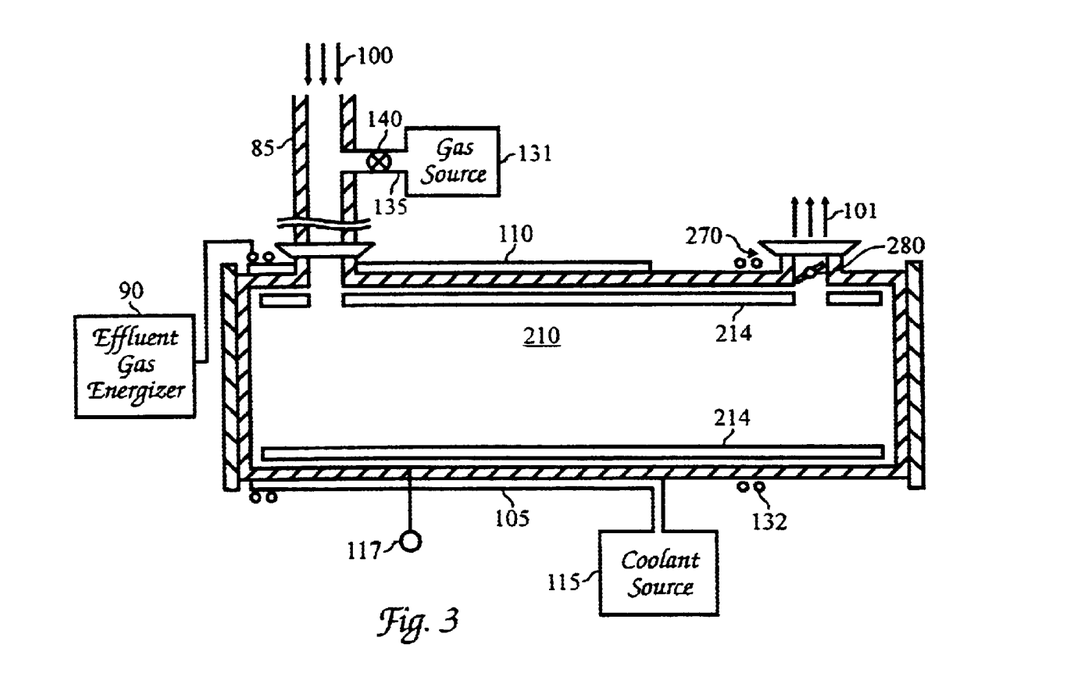
FIG. 3 is a schematic sectional side view of an embodiment of an effluent treatment gas plasma reactor which can be used with the effluent gas treatment apparatus.

The plasma reactor 210 preferably comprises an enclosed conduit through which a continuous stream of effluent flows as the effluent is energized by the gas energizer to abate the hazardous gas content of the effluent. The exhaust tube 85 has an inlet that forms a gas tight seal with an exhaust port of the process chamber 25. Effluent gas flows through the plasma reactor 210 to an outlet 270 that forms a gas tight seal with a vacuum pump 125. A throttle valve 280 may be placed near and on either side of the outlet 270 to control pressure in the plasma reactor and to draw out abated gas 101. The plasma reactor 210 is composed of gas impermeable material that has sufficient strength to withstand operating vacuum type pressures of $10^{-7}$ Torr. In addition, the plasma reactor 210 is made from material that is resistant to erosion from the energized effluent in the tube, and that withstands the high operating temperatures of conventional process chambers. The plasma reactor 210 may also have a transparent window that is transparent to the radiation coupled to the effluent, such as the RF or electromagnetic or microwave radiation. The plasma reactor 210 can be composed of a ceramic material such as quartz (silicon dioxide) or polycrystalline aluminum oxide. A separate gas source 131 optionally provides additive or reagent gas to the effluent gas 100 by control of the valve 140.

Figures 8, 9:
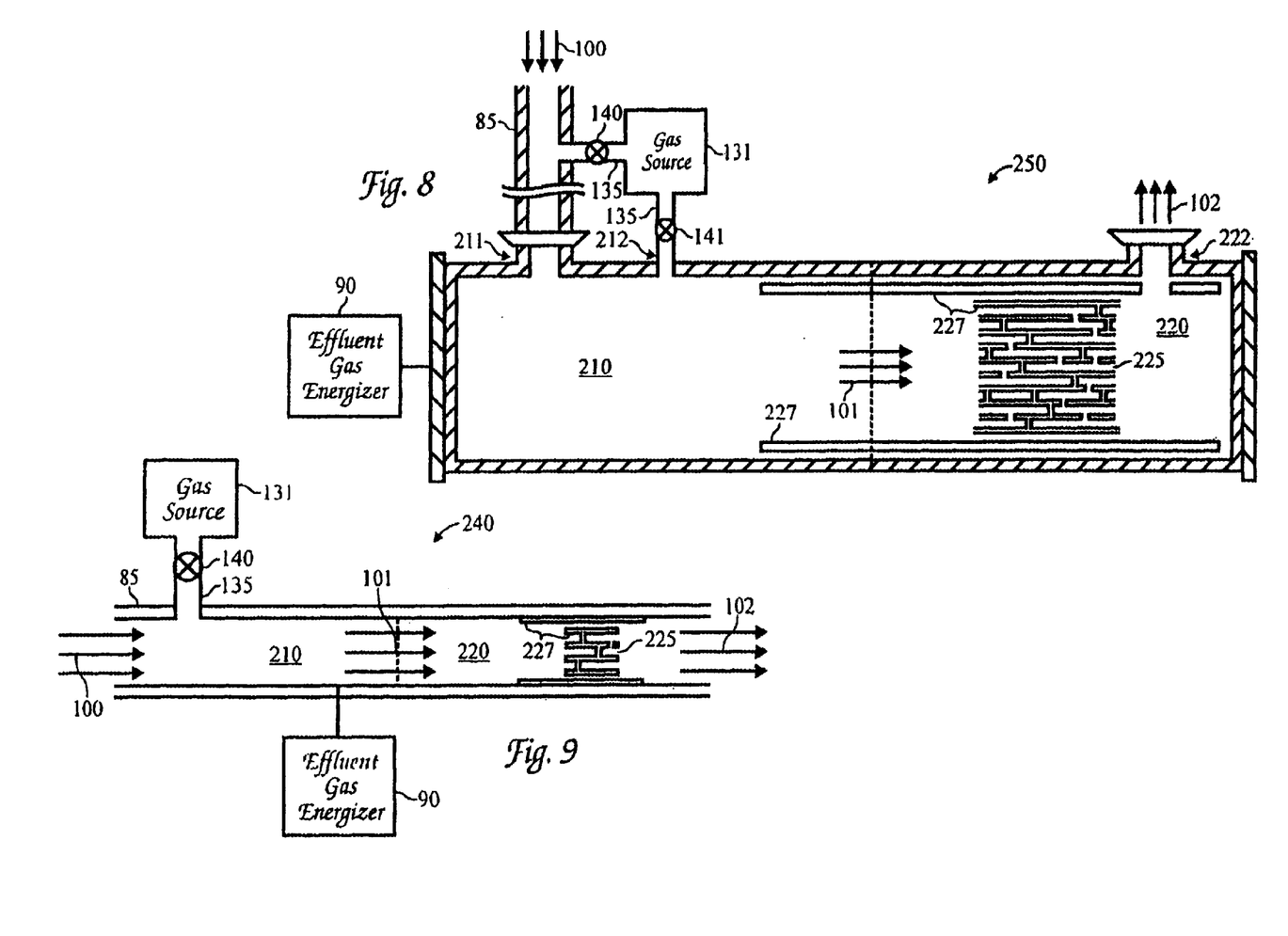
FIG. 8 is a schematic sectional side view of an alternative configuration of the plasma reactor and the catalytic reactor of the present invention.
FIG. 9 is a schematic sectional side view of an another configuration of the plasma reactor and the catalytic reactor of the present invention.

The reagent gas may alternatively or additionally be provided directly to the reactor, as shown in FIG. 8.

The shape and size of the plasma reactor 210 are selected to provide unrestricted and continuous flow of effluent from the process chamber 25 while preventing back diffusion of the effluent into the process chamber. Preferably, the exhaust tube 85 and plasma reactor 210 comprise a cross-sectional area (in a plane perpendicular to its long axis) that is sufficiently large to flow the effluent gas from the chamber to flow into the reactor at a rate that is equal to or greater than the rate at which process gas is supplied to the chamber, otherwise, a back pressure of process gas is formed in the process chamber. Preferably, the exhaust tube 85 and plasma reactor 210 comprise a diameter of at least about 5 mm, and most preferably of at least about 35 mm.

Most preferably, the plasma reactor 210 comprises a hollow cylinder having a longitudinal central axis that is oriented parallel to the direction of the flow path of effluent through the tube, and which can be easily adapted to existing process chamber 25 designs. The length of the plasma reactor is sufficiently long to allow the effluent to remain resident in the tube for a sufficient time to abate substantially all of the hazardous gas content of the effluent. The precise length of the plasma reactor 210 depends on a combination of factors including the diameter of the exhaust tube, the composition and peak flow rate of the effluent, and the power level applied to the abatement plasma. For a typical etching process comprising a process gas of $CF_4$, $O_2$, and $N_2$ at total flow of about 1000 sccm, and an RF or electromagnetic gas energizer 90 operated at about 1500 Watts, a sufficient resident time is at least about 0.01 seconds, and more preferably about 0.1 seconds. A suitable length of plasma reactor 210 that provides such a residence time, comprises a cylindrical tube having a cross-sectional diameter of 35 mm, and a length of from about 20 cm to about 50 cm.

Preferably, plasma reactor 210 is constructed and integrated with the chamber, to provide a laminar flow of effluent through the tube that undergoes little or no turbulence that would otherwise redirect the flow of effluent in directions other than along the longitudinal axial direction of the tube. In a preferred version, the exhaust tube comprises a cylinder having an interior flow surface that is parallel to the direction of the flow of the effluent through the exhaust tube, and that is substantially absent or free of projections or recesses that alter the effluent flow path or provide a non-laminar flow of effluent. The inner surfaces of the plasma reactor 210 comprise a surface roughness having a Reynolds number of less than about 10.

The gas treatment apparatus 200 of the present invention may also include a cooling jacket 105 enclosing at least a portion of the plasma reactor 210, forming an annulus 110 through which a coolant is passed to remove excess heat generated by the abatement plasma. The material of the cooling jacket 105 is selected to withstand the mechanical and thermal stresses of the application. Preferably the material of the cooling jacket 105 comprises a coefficient of thermal expansion, similar to that of the plasma reactor 210 so that the dimensions of the cooling annulus 110 remain constant. More preferably, the cooling jacket 105 further comprises a window of material transparent to microwave and electromagnetic radiation so that the gas energizer can couple the ionizing radiation through the cooling jacket 105 and coolant to the effluent inside the plasma reactor 210. Suitable materials for the cooling jacket 105 include aluminum oxide, quartz, sapphire, and monocrystalline sapphire. A temperature monitor 117 may also be provided to monitor temperature within the plasma reactor 210.

The cooling jacket 105 can be any size and shape that allow it to cover and pass fluid over at least a portion of the reactor 210 in which the abatement plasma is formed. Preferably, the cooling jacket 105 has an axial length and an inner cross-sectional area in a plane perpendicular to the central axis that forms an annulus 110 sufficiently large to adequately cool the plasma reactor 210, yet not obstruct the transmission of ionizing radiation into the reactor 210. Accordingly, the precise dimensions of the cooling jacket 105 will depend on those of the plasma reactor 210, the flow rate and specific heat capacity of the coolant used, and the power level of the abatement plasma. For the cylindrical plasma reactor 210 described above, a suitable cooling jacket 105 would also be a hollow cylinder surrounding and sealed at either end to the plasma reactor 210 and having a length of from about 20 cm to about 50 cm, and an inner diameter of from about 6 cm to about 40 cm. Providing a rough finish on an outer surface of the plasma reactor 210, such that the flow of coolant along the surface is broken up, ejects heated liquid away from the hot surface of the reactor 210 causing cooler liquid to replace it, thereby enhancing the cooling. Preferably the finish of the outer surface of the plasma reactor 210 comprises a Reynolds number of about 70 or greater. Coolant is supplied to the annulus 110 of the cooling jacket 105 from a coolant chiller-recirculator 115 through one or more pairs of inlet and outlet ports at a rate sufficient to remove the excess heat generated by the plasma in the plasma reactor 210. It has been found that a coolant flow of from about 2 liters/min (~0.5 gpm) to about 6 liters/min (~1.5 gpm) is sufficiently high to remove the excess heat. Preferably, the coolant comprises a fluid having little or no conductance such as deionized water.

The gas energizer 90 comprises a source of energetic radiation that couples electromagnetic or microwave energy to the effluent in the plasma reactor 210 to form an energized gas or plasma. In one version, the gas energizer 90 comprises an RF or electromagnetic gas energizer capable of producing a power output of at least 500 Watts. The electromagnetic gas energizer 90 may have a variable power output which can be remotely adjusted by an operator or a controller from about 500 to about 5000 Watts.

Figure 4A:
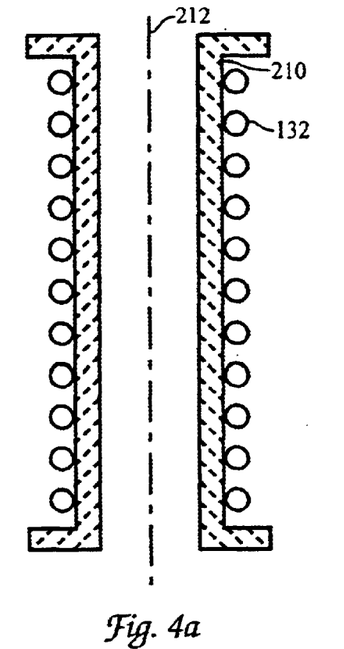
FIG. 4a is a schematic sectional side view of a version of an RF or electromagnetic gas energizer comprising an inductor antenna having one or more coils.
Figure 4B:
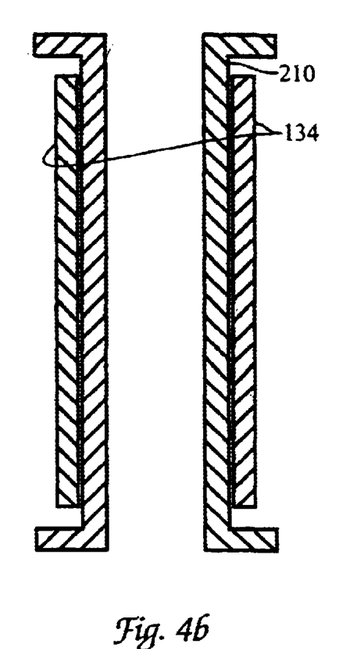
FIG. 4b is a schematic sectional side view of one version of an RF or electromagnetic gas energizer comprising a pair of opposed electrodes.

In one embodiment, the gas energizer 90 comprises a plasma generator that provides RF energy to the effluent in the plasma reactor 210 to energize and dissociate the effluent to form ionized plasma. In one version, the RF gas energizer 90 comprises an inductor antenna 132 consisting of one or more inductor coils having a circular symmetry with a central axis coincident with the longitudinal vertical axis 212 that extends through the center of the plasma reactor 210, as shown in FIG. 4a. For example, the inductor antenna 132 can comprise a longitudinal spiraling coil that wraps around the plasma reactor 210 to couple RF or electromagnetic energy in the effluent traveling through the exhaust tube. Preferably, the inductor antenna 132 extends across a length that is sufficiently long to energize an extended path-length of effluent gas flowing thorough the exhaust tube to abate substantially all the hazardous gas species in the effluent, as the effluent flows through the exhaust tube. Optionally, the inductor antenna 132 can be located inside the reactor 210. Alternatively, or in combination with the antenna, the electromagnetic gas energizer 90 can also comprise electrodes 134 having a circular symmetry with a central axis coincident with the longitudinal vertical axis that extends through the center of the plasma reactor 210, as shown in FIG. 4b. In a preferred version, the electrodes 134 comprise flat parallel plates separated by a distance that is sufficiently small to couple energy into the effluent gas flowing between the plates. More preferably, the electrodes 134 comprise opposing semi-cylindrical curved plates that are aligned on the walls of the exhaust tube. As with the inductor antenna 132, the length of each of the facing electrodes 134 is sufficiently long to energize an extended path-length of effluent gas that flows through the exhaust tube to abate substantially all the hazardous gas species in the effluent. Optionally, the electrodes can be located inside the reactor 210.

In yet another version, the gas energizer can comprise a microwave gas energizer of any commercially available type, such as for example, a microwave generators from Daihen Corporation, Osaka, Japan. The microwave gas energizer further comprises a waveguide for coupling the microwave radiation from a microwave source to the effluent in the plasma reactor 210, and a tuning assembly for concentrating or focusing the microwave radiation inside the exhaust tube. Generally, the waveguide has a rectangular cross-section, the interior dimensions of which are selected to optimize transmission of radiation at a frequency corresponding to the operating frequency of the microwave generator. For example, for a microwave generator operating at 2.45 GHz, the waveguide forms a rectangle of 5.6 cm by 11.2 cm. The tuning assembly comprises a short segment of waveguide that is closed on one end, and that is positioned on the opposite side of the plasma reactor 210 from and in line with the waveguide. Note that FIG. 3 merely shows an exemplary representation of the parts of the plasma reactor and does not necessarily represent the precise relative location of all of the parts.

Referring to FIG. 3, preferably the plasma reactor 210 includes a consumable liner of any material that reacts favorably with fluorine. The liner 214 may, for example, be made of silica (silicon dioxide) or other silicon-containing materials. In one version, dense quartz or a sponge of silica is used. The liner 214 absorbs fluorine and readily converts atomic fluorine to $SiF_4$, for example, and thereby inhibits the formation of PFCs such as $CF_4$. Additionally, when a hydrogen containing gas is present, the hydrogen combines with the fluorine to produce HF. The combination of these two factors significantly reduces the recombination of PFCs such as $CF_4$. Any material that absorbs an undesirable gas and/or readily converts undesirable gases to more desirable gases can be used as the absorbable liner 214. The consumable liner may be a dielectric material or may be a material that does not serve as an electrode for energizing gas in the reactor 210.

Figure 5:
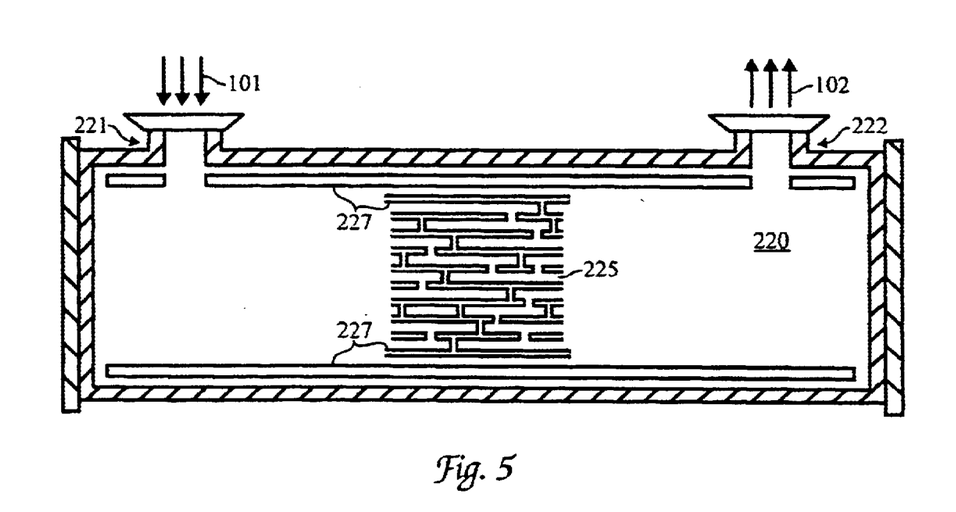
FIG. 5 is a schematic sectional side view of an embodiment of a catalytic reactor of the present invention which can be used with the effluent gas treatment apparatus.

The abated gas 101 is then passed through a catalytic reactor 220. One version of the catalytic reactor 220 is shown in FIG. 5 and is preferably located between the effluent plasma reactor 210 and the vacuum pump 125 so as to receive the abated effluent gas 101 from the plasma reactor 210 under the flow influence of the vacuum pump 125. Effluent gas 101 enters the catalytic reactor 220 through an inlet 221, passes through the reactor 220 and exits the reactor through an outlet 222. The non-toxic gas 102 exiting the catalytic reactor is safe to be exhausted or is easily treated for safe exhaustion. The catalytic reactor 220 preferably comprises catalytic surfaces 227. Within the catalytic reactor 220, the surface area of the reactor walls or surfaces 227 is preferably increased by providing an increased surface area structure 225 over and through which the effluent gas 101 passes as it flows from the inlet 221 to the outlet 222. The increased surface area structure can be, for example, ceramic honeycomb, foam or packed pellets. The surfaces 227 and/or the increased surface area structure 225 can be fabricated from cordierite, $Al_2O_3$, zeolite, alumina-silica, silicon carbide, silicon nitride, or other ceramic material or the like. The surfaces 227 and/or the increased surface area structure 225 may be coated with support materials, such as $ZrO_2$, $Al_2O_3$, $TiO_2$ or combinations of these or other oxides. These support materials may be catalytic. The support materials may also be impregnated with catalytic metals, such as Pt, Pd, Rh, Cu, Ni, Co, Ag, Mo, W, V, La, or combinations thereof or others known to enhance catalytic activity.

During operation of the gas treatment apparatus 200 in a typical semiconductor process, a semiconductor substrate 30 is placed on the support 40 in the process chamber 25, and a process gas comprising fluorine-containing gas such as $CF_4$, $C_2F_6$, $C_3F_8$, $CHF_3$, $SF_6$, $NF_3$, $COF_2$, $CH_3F$, and the like, is intruduced into the process zone 35 through the process gas distributor 72. The process gas is energized by the gas energizer 60 in the chamber 25 to process the substrate 30 in an RF or electromagnetic plasma gas or a microwave energized gas. Alternatively, the gas may be energized in a remote chamber. During and after processing, an effluent gas stream of spent process gas and gaseous byproducts are exhausted from the process chamber 25 through the exhaust tube 85 of the exhaust system 80 and gas treatment apparatus 200. Preferably, oxygen containing gas, such as $O_2$, $O_3$, TEOS, or any other gas that readily gives up oxygen, is added to the effluent 100 by opening valve 140. Optionally, a second additive or reagent gas comprising hydrogen, such as $H_2$, $H_2O$, $SiH_4$, or similar, may be added to the effluent 100 and oxygen containing gas or may be added directly to the plasma reactor 210 in order to further enhance the overall efficiency of toxic gas destruction as will be discussed below.

In the plasma reactor 210, an electromagnetic energy or microwave energy, is coupled to the continuous stream of effluent flowing from the exhaust tube, to form an abatement plasma in which hazardous gas components in the effluent are dissociated or reacted with one another to substantially abate the hazardous gas content of the effluent. The radiation raises the energy of some electrons of the atoms of the effluent gas molecules to energies from 1 to 10 eV, thereby freeing electrons and breaking the bonds of the gas molecules to form dissociated atomic gaseous species. In an energized plasma gas, avalanche breakdown occurs in the gaseous stream when the individual charged species electrons and charged nuclei are accelerated in the prevalent electric and magnetic fields to collide with other gas molecules causing further dissociation and ionization of the effluent gas.

Figure 6:
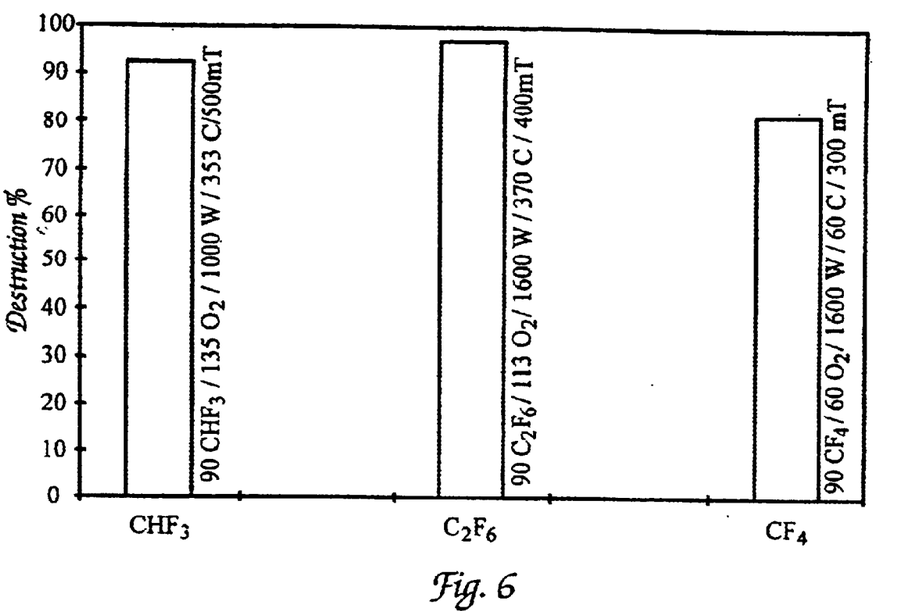
FIG. 6 is a graph showing the percent destruction of PFC gases in a plasma reactor of the present invention operated at varying process conditions.

The ionized or dissociated gaseous species of the energized effluent react with each other, or with other non-dissociated gaseous species, to form non-toxic gases or gases that are highly soluble in conventional gas scrubbers. For example, PFC containing effluent is mixed with $O_2$ gas and passed through the plasma reactor 210. The preferably inductively coupled plasma reactor 210 dissociates the PFC gases and also provides inductive heating to the gas species. Additional H or OH containing gas, for example $H_2$, $H_2O$, $SiH_4$, etc., can be added to the effluent 100 with the $O_2$. The addition of such hydrogen containing species enhances the overall efficiency of PFC destruction as determined by chemical kinetic modeling. The plasma reactor 210 generates an inductively heated gas 101 comprising a mixture of dissociated species, for example $CF_3$, $CF_2$, COF, O, OH, etc. The gas 101 exiting the plasma reactor 210 has been determined to have about a 92 to 98 percent destruction of the PFC gases $CHF_3$ and $C_2F_6$ and about an 80 percent destruction of $CF_4$, as shown in FIG. 6. This destruction is due to a combination of the added gases and the consumable lining in the plasma reactor 210. $CF_4$ destruction is difficult in that radicals have a high tendency to recombine back to form $CF_4$. The recombination is dependent on the chamber surfaces, as discussed above. FIG. 6 is a graph showing the percent destruction of PFC gases in a plasma reactor 210 under the following conditions: (i) 90 sccm CHF3, 135 sccm $O_2$, 1000 Watts, 353° C., 500 mTorr; (ii) 90 sccm $C_2F_6$, 113 sccm $O_2$, 1600 Watts, 370° C., 400 mTorr; and (iii) 90 sccm $CF_4$4, 60 sccm $O_2$, 1600 Watts, 60° C., 300 mTorr.

To further abate the undesirable gases, the resulting heated gas mixture 101 is then passed through the catalytic reactor 220 to provide favorable conditions that form, for example, $COF_2$ and HF that can be removed by conventional water scrubbing techniques. The catalytic reactor 220 preferably comprises an interior surface 227, such as a ceramic surface, that catalyzes reaction of the hazardous gas to form non-hazardous effluent byproducts. Preferably, the interior surface 227 is a surface of a high surface area structure 225 such as a honeycomb, foam or pellet structure, preferably made from a ceramic material. The high surface area structure 225 is fabricated from a ceramic material coated with a catalytic material. As the heated gas mixture is passed over the catalytic surfaces, the fluorine molecules polarize the oxides and increase their overall acidity and catalytic activity in the presence of water vapor, thereby promoting hydrogenation to HF and $COF_2$. The HF and $COF_2$ can be readily water scrubbed.

Figure 7:
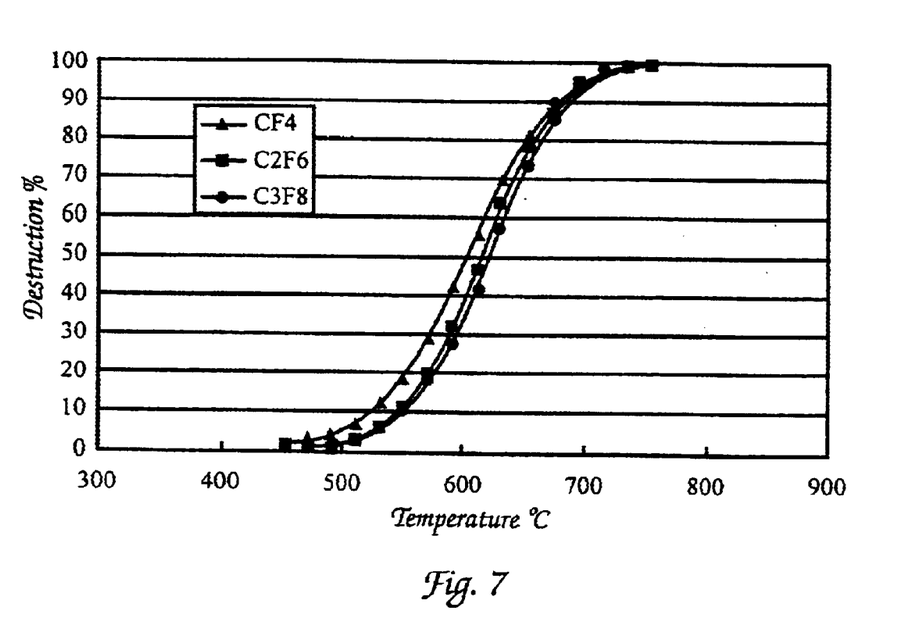
FIG. 7 is a graph showing that elevated temperatures increase catalytic conversion of perfluorocompound gases into non-hazardous or less hazardous gases.

Elevated temperatures encourage the chemical breakdown of the PFC gases. The 1200° C. requirement of conventional chemical-thermal abatement systems can be greatly reduced by using the catalytic reactor 220, as shown by FIG. 7. FIG. 7 shows the temperature and PFC gas destruction relationship for $CF_4$, $C_2F_6$, and $C_3F_8$. Using the catalytic reactor 220, almost complete abatement of PFCs was accomplished at temperatures of about or below 700° C. The lower temperature is desirable because it allows for a more efficient system because it is not necessary to heat the gas to such a high temperature, thereby speeding up treatment of the exhaust gas and reducing the need for extensive insulation and cooling systems.

The necessary temperature is even further reduced by using the catalytic reactor 220 in combination with the plasma reactor 210. The elevated temperature of the inductively heated gas species 101 favorably impacts conversion of radicals into easily removable or disposable byproducts. It has been found that temperatures ranging from about ambient to about 400° C. provide abatement of PFC gases by about 95 percent to about 100 percent. For example, treatment of effluent containing $C_2F_6$ first in plasma reactor 210 abates the $C_2F_6$ by about 98 percent. Subsequent treatment in the catalytic reactor 220 abates substantially all of the $C_2F_6$, even at room temperature. Absent the consumable liner in the plasma reactor 210, it inductively heating $C_2F_6$ containing effluent from about 100° C. to about 400° C. and subsequent treatment in the catalytic reactor 220 provides sufficient abatement. $CF_4$ which readily recombines when disassociated to form $CF_4$ is best abated using a consumable liner in the plasma reactor 210 and temperatures greater than about 300° C., preferably from about 300° C. to about 700° C., and most preferably about 370° C. An unexpectedly high rate of destruction of PFC gases passing through the plasma reactor 210 and the catalytic reactor 220 results. Catalytic activity can be further enhanced by impregnating the catalytic surfaces with metals such as Pt, Pd, Rh, Cu, Ni, Co or other metals known to so enhance catalysis.

All components and temperatures are easily controlled to assure at least 95 percent abatement of hazardous gases, including PFCs in the effluent. After passing through the plasma reactor 210 and through the catalytic reactor 220, the effluent gas is substantially abated of toxic gases and may be safely exhausted. The addition of the catalytic reactor 220 provides an opportunity to both increase surface area and optimize catalytic materials selection to maximize conversion at the existing temperature of the gases exiting from the plasma reactor 210.

An alternative configuration of the plasma reactor 210 and the catalytic reactor 220 is shown in FIG. 8. In this embodiment, the plasma reactor 210 and the catalytic reactor 220 are housed within the same housing 230. Effluent gas 100 from the processing chamber 25 passes through the exhaust tube 85 as allowed by throttle valve 82. The effluent is mixed with oxygen containing gas from the gas source 131. Optionally, $H_2$, $H_2O$, $SiH_4$ or other hydrogen containing gas can be mixed into the effluent either within the exhaust tube 85 or within the plasma reactor by opening valve 141 at inlet 212. Inductively heated effluent 101 containing dissociated PFC gases is directly passed to the catalytic reactor for further abatement of the effluent as discussed above. Optionally, the catalytic surfaces 227, including the high surface area structure 225, may extend partly or entirely into the plasma reactor 210 to even further promote hydrogenation of HF and $COF_2$. Most preferably, a portion of the ceramic walls 227 extends partly into the plasma reactor 210 while the high surface area structure 225 is located downstream of the reactor 210, as shown in FIG. 8.

Another alternative configuration is shown in FIG. 9. In this embodiment of the gas treatment apparatus 240, the exhaust tube 85 itself serves as both the plasma reactor 210 and the catalytic reactor 220. The gas treatment apparatus 200 further provides a laminar and non-turbulent flow of effluent gas through the exhaust tube 85 that reduces the turbulence of the effluent gas flow stream and prevents back-diffusion of spent process gas into the chamber 25. Moreover, the emissions of the effluent gas are abated in a continuous flow stream which does not constrict or limit flow rates of process gas into the chamber, thereby providing a larger window of process conditions that can be performed in the chamber. Also, deposition of gaseous reaction byproducts on the inner surface of the exhaust tube, which would otherwise accumulate and impede the coupling of the ionizing radiation, is reduced by forcing the effluent to flow continuously past the inner surfaces of the exhaust tube 85, 240.

In one embodiment, the exhaust tube 85 is placed in a vertical orientation directly beneath the process chamber 25 (not shown). This embodiment provides a more laminar and less turbulent flow of effluent along the flow path. The laminar flow eliminates turbulence of the effluent gas flow stream and reduces the possibility that effluent gas will diffuse back into the process chamber 25. Positioning the exhaust tube 85 further downstream from the exhaust throttle valve 80, further reduces the possibility of a back flow of effluent gas from entering and contaminating the process chamber 25 because the pressure in the exhaust tube 85 is lower than the pressure in the process chamber. In addition, a laminar flow of effluent allows energizing radiation to be coupled in a high strength in the region immediately adjacent to the inner surface of the exhaust tube 85 to form a higher density of energized effluent gas or plasma. Also, because the effluent flows continually and uniformly past the inner surface of the exhaust tube 85, the deposition of byproducts on the inner surface, which would otherwise accumulate and impede the coupling of the ionizing radiation, make it unnecessary to frequently clean the exhaust tube 85.

The gas treatment apparatus 200 may include a reagent gas mixer system 131 for mixing reagent gas into the effluent gas stream, before or after the effluent is energized, to enhance abatement of the hazardous gas emissions. When added before the effluent is energized, the reagent gas dissociates or forms energized species that react with the energized hazardous gas species to create gaseous compounds that are non-toxic, or soluble and easily removed by a wet scrubber located downstream in the exhaust system. The addition of even a small amount of reagent gas to the effluent gas stream can significantly improve abatement efficiency. As discussed above, the reagent gas is added to the effluent gas stream through a reagent gas port 135 positioned sufficiently close to the inlet of the exhaust tube 85 to allow the reagent gas to completely mix with and react with the hazardous gas in the effluent stream before the effluent exits from the exhaust tube. The reagent gas port 135 may be located less than about 10 cm from the inlet of the exhaust tube 85 and oriented to provide good mixing. Also, the reagent gas port 135 may comprise an injection nozzle outlet that directs the reagent gas stream into the exhaust tube, such that the reagent gas forms a laminar stream flowing in the same direction as the direction of the laminar flow of the effluent, and along the inner surface of the exhaust tube 85. For example, the outlet of the reagent gas port 135 may be in an angular orientation relative to the interior surface of the exhaust tube 85 to flow the reagent gas stream into the exhaust tube 85 in the same direction as the effluent gas stream. A valve 140 or 141 (or mass flow controller) in the reagent gas port 135 allows an operator or an automatic control system to adjust the volumetric flow of the reagent gas to a level that is sufficiently high to abate substantially all the hazardous gas emissions of the effluent.

Figures 10, 11:
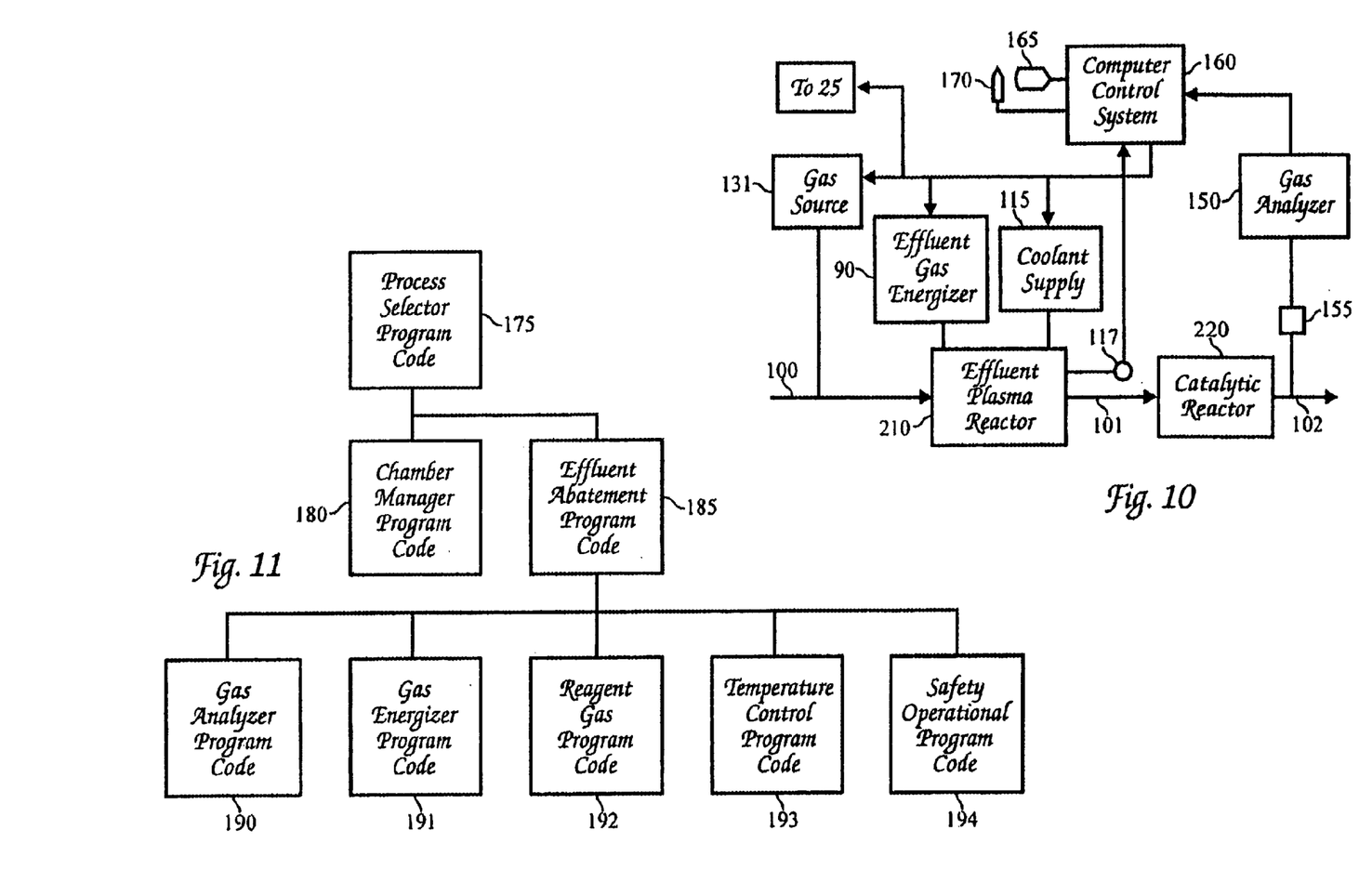
FIG. 10 is a diagram showing yet another embodiment of the present invention including a gas analyzer having a gas analysis probe.
FIG. 11 is a diagram showing a preferred version of the computer program code used to operate the present invention.

In yet another embodiment, shown in FIG. 10, the gas treatment apparatus 75 comprises a gas analyzer 150 having a gas analysis probe 155 for detecting and monitoring the composition or concentration of hazardous gas components in the effluent stream, either before or after the effluent is energized. Preferably, the gas analysis probe 155 is mounted near the outlet of the exhaust 102, well below the abatement plasma generation zone, and more preferably, about 10 cm to about 200 cm from the outlet of the exhaust, to measure the hazardous gas content of the energized effluent gas. The gas analyzer 150 comprises any commercially available gas analyzer, such as for example, the RGA 300 system commercially available from Stanford Research Systems, Sunnyvale, Calif. The gas analyzer 150 is programmed to analyze the composition of the effluent gas, especially the hazardous gas concentration, and provide an output signal in relation to the hazardous gas content, to a computer controller system 160 that controls and adjusts the operation of the gas treatment apparatus 200 and of process chamber 25 according to the output signal.

In operation, the gas analyzer 150 continuously monitors the hazardous gas content of the effluent emitted from the gas treatment apparatus 200 and provides a continuous output signal, or a safety level output signal, that is triggered when the hazardous gas content of the effluent exceeds a safety level. The computer controller system 160 comprises a computer readable medium having computer readable program code embodied therein that monitors the output signal(s) from the gas analyzer and performs at least one of the following steps: (i) adjusts the operating power level of the gas energizer 90 to reduce the hazardous gas content of the effluent, (ii) adjusts process conditions in the process chamber 25 to reduce the hazardous gas content of the effluent, (iii) adds a reagent gas to the effluent gas to reduce the hazardous gas emissions, (iv) terminates a process conducted in the process chamber 25, or (v) provides an alarm signal to notify an operator of dangerously high levels of hazardous gas in the effluent.

The computer controller system 160 preferably operates the process chamber 25 and gas treatment apparatus 200 and comprises a computer program code product that controls a computer comprising one or more central processor units (CPUs) interconnected to a memory system with peripheral control components, such as for example, a PENTIUM microprocessor, commercially available from Intel Corporation, Santa Clara, Calif. The CPUs of the computer control system 160 can also comprise ASIC (application specific integrated circuits) that operate a particular component of the chamber 25 or the gas treatment apparatus 75. The interface between an operator and the computer system is a CRT monitor 165 and a light pen 170, as shown in FIG. 10. The light pen 170 detects light emitted by the CRT monitor 165 with a light sensor in the tip of the pen 170. To select a particular screen or function, the operator touches a designated area of the CRT monitor 165 and pushes a button on the pen 170. The area touched changes its color or a new menu or screen is displayed to confirm the communication between the light pen and the CRT monitor 165. Other devices, such as a keyboard, mouse or pointing communication device can also be used to communicate with the computer controller system 160.

The computer program code operating the CPU(s) and other devices of the computer can be written in any conventional computer readable programming language, such as for example, assembly language, C, $C^{++}$, or Pascal. Suitable program code is entered into a single file, or multiple files, using a conventional text editor and stored or embodied in a computer-usable medium, such as a memory system of the computer. If the entered code text is in a high level language, the code is compiled to a compiler code which is linked with an object code of precompiled windows library routines. To execute the linked and compiled object code, the system user invokes the object code, causing the computer to load the code in memory to perform the tasks identified in the computer program.

The computer program code comprises one or more sets of computer instructions that dictate the timing, process gas composition, chamber pressure and temperature, electromagnetic power levels inside the chamber, susceptor positioning, and other parameters of the process chamber 25. The computer program instruction set also controls operation of the gas treatment apparatus 200, and settings for power levels of the energy coupled into the plasma reactor 210, the flow levels and composition of reagent gas introduced into the exhaust tube 85 or plasma reactor 210, and the alarms and other safety operational modes of the gas treatment apparatus 200 or process chamber 25 that are triggered by a predefined concentration of hazardous gas in the effluent, or by the presence of a toxic hazardous gas even in minute trace levels in the effluent.

A preferred version of the computer program code, as illustrated in FIG. 11, comprises multiple sets of program code instructions, such as a process selector and sequencer program code 175 that allows an operator to enter and select a process recipe, and that executes operation of the process recipe in a selected process chamber 25, chamber manager program code 180 for operating and managing priorities of the chamber components in the process chamber 25, and effluent abatement program code 185 for operating the gas treatment apparatus 200. While illustrated as separate program codes that perform a set of tasks, it should be understood that these program codes can be integrated, or the tasks of one program code integrated with the tasks of another program code to provide a desired set of tasks. Thus the computer controller system 160 and program code described herein should not be limited to the specific embodiment of the program codes described herein, and other sets of program code or computer instructions that perform equivalent functions are within the scope of the present invention.

In operation, a user enters a process set and process chamber number into the process selector program code 175 via the video interface terminal 165. The process sets are composed of process parameters necessary to carry out a specific process in the chamber 25, and are identified by predefined set numbers. The process selector program code 175 identifies a desired process chamber, and the desired set of process parameters needed to operate the process chamber for performing a particular process. The process parameters include process conditions, such as for example, process gas composition and flow rates, chamber temperature and pressure, plasma parameters such as microwave or RF or electromagnetic bias power levels and magnetic field power levels, cooling gas pressure, and chamber wall temperature.

The process selector program code 175 executes the process set by passing the particular process set parameters to the chamber manager program code 180 which control multiple processing tasks in different process chambers according to the process set determined by the process selector program code 175. For example, the chamber manager program code 180 comprises program code for etching a substrate or depositing material on a substrate in the chamber 25. The chamber manager program code 180 controls execution of various chamber component program code instructions sets which control operation of the chamber components. Examples of chamber component control program code include substrate positioning instructions sets that control robot components that load and remove the substrate onto the support 30, process gas control instruction sets that control the composition and flow rates of process gas supplied into the chamber 25, pressure control instruction sets that set the size of the opening of the throttle valve 82, and plasma control instruction sets that control the power level of the plasma activator 60. In operation, the chamber manager program code 180 selectively calls the chamber component instruction sets in accordance with the particular process set being executed, schedules the chamber component instruction sets, monitors operation of the various chamber components, determines which component needs to be operated based on the process parameters for the process set to be executed, and causes execution of a chamber component instruction set responsive to the monitoring and determining steps.

The effluent abatement program code 185 comprises program code instruction sets for monitoring the concentration of predefined hazardous gases in the effluent gas stream, and operating the process chamber or gas treatment components in relationship to the hazardous gas content/composition in the effluent gas stream. A preferred structure of the effluent abatement program code 185 comprises (i) gas analyzer program code 190 for receiving the output signals of the hazardous gas content and composition (or safety level output signal) from the gas analysis probe 155 and storing the output signals in an Effluent Gas Composition Table that is periodically surveyed by the other program code instruction sets, (ii) gas energizer program code 191 for operating the gas energizer 90 in relation to the output signals in the Table, (iii) reagent gas program code 192 for operating the reagent gas mixer 132, (iv) a temperature control program code 193 for controlling the temperature of the plasma reactor, and (v) safety operational program code 193 for monitoring the emission levels of the hazardous gas in the effluent, and adjusting operation of the process chamber to reduce or substantially eliminate the hazardous gas emissions.

The gas analyzer program code 190 monitors the composition or concentration of hazardous gas in the energized effluent as determined by the gas analyzer 150, and receives the output signals of the hazardous gas content and composition (or the safety level output signal) from the gas analysis probe 155. The gas analyzer program code 190 stores the output signals in an Effluent Gas Composition Table that is periodically surveyed by the other program code instruction sets. Alternatively, or in combination with the storage function, the gas analyzer program code 190 passes a safety level output signal to other program code instructional sets, when the hazardous gas content in the effluent gas exceeds a predefined operational safety level. The gas analyzer program code 190 can also be integrated into the gas analyzer 150, instead of being resident in the computer controller system.

The gas energizer program code 191 includes program code instruction sets for adjusting power to the gas energizer 90 in response to signals passed by the gas analyzer program code 190. The power level of the electromagnetic or microwave energy coupled to the plasma reactor 210, is controlled in relation to the hazardous gas content in the effluent gas stream. For example, when an increase in hazardous gas content is detected, the gas energizer program code 191 increases the power level of the gas energizer 90 to couple more energy into the effluent gas to increase dissociation and ionization of the effluent gas species to reduce the hazardous gas emissions of the effluent. Conversely, upon detection of a decrease in hazardous gas content, the gas energizer program code 191 can decrease the power level of the gas energizer 90 to couple less energy into the effluent gas.

The reagent gas program code 192 includes program code instruction sets for controlling the reagent gas composition and flow levels through the reagent gas mixer 132 to further reduce the hazardous gas emissions in the effluent. Typically, the reagent gas program code 192 adjusts the opening of one or more reagent gas valves 140, 141 in response to the output signals passed by the gas analyzer program code 190 (or upon verification from the Effluent Gas Composition Table that an output signal has exceeded a safety level). When an increase in hazardous gas content is detected, the reagent gas program code 192 energizes a flow, or increases a flow rate, of reagent gas into the plasma reactor 210 to further reduce the hazardous gas emissions, and vice versa.

The temperature control code 193 includes program code that responds to reactor temperature readings 117 to maintain the temperature of the reactor 210 at an optimal level for undesirable gas destruction by for example controlling the gas energizer 90 of plasma reactor 210 or controlling the amount of coolant supplied to the reactor 210 by the coolant source 115.

The safety operational program code 194 operates in conjunction with the other program code instruction sets and the gas analyzer 150 to adjust operation of the process chamber components or the gas treatment apparatus in relation to the levels of hazardous gas in the effluent stream to reduce or eliminate the hazardous gas emissions. For example, the safety operational program code 194 can be programmed to shut-down operation of the process chamber 25 upon detection of a predefined concentration of hazardous gas in the exhaust effluent, or of the presence of toxic hazardous gas even in minute trace levels in the effluent. Typically, when toxic gases are used in the processing of the substrate, several safety shut-off valves are on each gas supply line of the gas distributor 72, in conventional configurations. The safety operational program code 194 provides a trigger signal to the process gas control instructions set of the chamber manager program code 180 to close the safety shut-off valves when the concentration of hazardous gas in the effluent reaches a predefined level. Conversely, when the safety operational program code 194 receives a low or zero emissions level signal from the output of the gas analyzer 150, the program code provides a control signal that instructs the chamber manager program code 180 to continue to operate the process chamber 25 in the current operational mode, and that also instructs the effluent abatement program code 185 to continue to operate the gas treatment apparatus 200 in its current operational mode.

The safety operational program code 194 can also energize other safety operational modes of the gas treatment apparatus 200 or other components of the hazardous gas content when the hazardous gas emissions exceed a predefined safety level. For example, the safety operational program code 194 can initiate a controlled shutdown of the process chamber 25 when a safety level output signal is passed to the chamber manager program code 180 to ramp up/down the process gas mass flow controllers, until a flow rate of process gas that reduces the hazardous gas content in the effluent to below acceptable safety levels, is achieved. In operation, the safety operational program code 193 repeatedly reads the latest effluent gas composition in the Effluent Gas Composition Table, compares the readings to a signal from the mass flow controllers controlling process gas flow into the chamber 25, and sends instructions to adjust the flow rates of the process gas as necessary to reduce or entirely eliminate the hazardous gas emissions in the effluent. Alternatively, the safety operational program code 194 performs these operations when it receives a safety level output signal. Typically, this program code is set to operate when the concentration of hazardous gas in the effluent exceeds a predetermined value, such as a concentration of from about 0.1% to about 10%.

In another example, the safety operational program code 194 can also operate an alarm or an indicator, such as a LED light, to indicate a dangerous level of toxic or hazardous gas in the effluent gas stream; or provide a metering display, such as a graphic real-time image that shows in real time the level of emissions of hazardous gas for monitoring by an operator. This safety feature allows an operator to monitor and prevent accidental emissions of hazardous gas into the atmosphere. The same signal can be used to maintain the processing apparatus 25 in a non-operational mode, or to energize the safety shut-off valves when an unsafe process condition is detected. In this manner, the safety operational program code 194 operates the process chamber and the gas treatment apparatus to provide an environmentally safe apparatus.

Although the present invention has been described in considerable detail with regard to certain preferred versions thereof, other versions are possible. Also, the apparatus of the present invention can be used in other chambers and for other processes, such as physical vapor deposition and chemical vapor deposition. Therefore, the appended claims should not be limited to the description of the preferred versions contained herein.

What is claimed is:

1. A substrate processing apparatus comprising:
   (i) a substrate processing chamber capable of processing a substrate in an energized gas, the chamber comprising:
      (a) a substrate support;
      (b) a gas supply to provide a gas in the chamber;
      (c) a process gas energizer capable of energizing the gas to process a substrate or clean the chamber, thereby generating an effluent gas; and
      (d) an exhaust tube; and (ii) a gas treatment apparatus capable of reducing a hazardous gas content of effluent gas exhausted from the chamber, the gas treatment apparatus comprising:
  (a) a reactor comprising an effluent gas inlet connected to the exhaust tube adapted to receive effluent gas exhausted from the substrate processing chamber and an effluent gas outlet, the reactor comprising a liner lining at least a portion of a wall of the reactor, the liner comprising a consumable material, wherein the consumable material is capable of reducing a hazardous gas content of the effluent gas by reacting with the effluent gas as the effluent gas passes over the liner;
  (b) a source of additive gas; and
  (c) an effluent gas energizer adapted to couple RF or microwave energy to the effluent gas and the additive gas in the reactor.

2. An apparatus according to claim 1 wherein the consumable material is capable of reacting with and removing greater than about 80% of the hazardous gas from the effluent gas.

3. An apparatus according to claim 1 wherein the consumable material comprises silica.

4. An apparatus according to claim 1 the apparatus further comprising a first port adapted to receive effluent gas from the chamber and a second port adapted to receive the additive gas.

5. An apparatus according to claim 1 wherein the effluent gas energizer comprises an inductor antenna outside or inside the reactor.

6. An apparatus according to claim 1 wherein the source of additive gas comprises a source of oxygen-containing gas.

7. An apparatus according to claim 1 wherein the source of additive gas comprises a source of hydrogen-containing gas.

8. An apparatus according to claim 1 wherein the source of additive gas comprises a source of $H_2O$.

9. An apparatus according to claim 1 further comprising a catalytic reactor comprising catalytic material adapted to catalyze reactions in the effluent gas to reduce hazardous gas therefrom.

10. An apparatus according to claim 9 wherein the catalytic material comprises catalytic surfaces that extend at least partially into the gas reactor.

11. An apparatus according to claim 10 wherein the catalytic surfaces are on a ceramic.

12. An apparatus according to claim 9 wherein the catalytic material comprises catalytic surfaces comprising one or more of cordierite, $Al_2O_3$, alumina-silica, silicon carbide, silicon nitride, or a metal catalyst.

13. An apparatus according to claim 9 wherein the effluent gas energizer is adapted to couple RF or microwave energy to the effluent gas to form energized effluent gas species, and the catalytic reactor is adapted to catalyze reactions in the energized effluent gas species to reduce a hazardous gas content thereof.

14. An apparatus according to claim 1 wherein the reactor comprises a path-length between the effluent gas inlet and effluent gas outlet, and wherein the gas energizer is adapted to couple RF or microwave energy to the effluent and additive gases across the path-length in the reactor to maintain a plasma across the path-length.

15. A method of performing a process in a substrate processing chamber and treating an effluent gas exhausted from the substrate processing chamber to reduce a hazardous gas content of the effluent gas, the method comprising:

(a) providing an energized gas in the chamber to process a substrate or clean the chamber, thereby generating an effluent gas, and exhausting the effluent gas from the substrate processing chamber;
(b) after (a), introducing the effluent gas exhausted from the substrate processing chamber into a reactor;
(c) introducing an additive gas into the reactor;
(d) coupling RF or microwave energy into the reactor, thereby energizing the effluent and additive gases in the reactor; and
(e) reacting the effluent gas with a consumable material in the reactor by passing the effluent gas over a liner that lines at least a portion of a wall of the reactor, the liner comprising the consumable material, to reduce a hazardous gas content of the effluent gas.

16. A method according to claim 15 further comprising the step of introducing a hydrogen containing gas into the reactor.

17. A method according to claim 15 further comprising the step of introducing $H_2$ or $SiH_4$ into the reactor.

18. A method according to claim 15 wherein step (c) comprises introducing $O_2$, $O_3$, or TEOS into the reactor.

19. A method according to claim 15 comprising the step of processing a substrate in the chamber and thereby forming an effluent gas comprising a perfluorocompound.

20. A method according to claim 15 wherein step (c) comprises introducing $H_2O$ into the reactor.

21. A method according to claim 15 comprising, before or after step (b), introducing the effluent gas into a catalytic reactor to catalyze reactions in the effluent gas.

22. A method according to claim 21 comprising coupling RF or microwave energy into the reactor to form energized effluent gas species, introducing energized effluent gas formed in the gas reactor into the catalytic reactor and catalyzing reactions in the energized effluent gas species to reduce a hazardous gas content thereof.

23. A method according to claim 15 wherein (d) comprises applying RF power to an inductor antenna outside or inside the reactor.

24. A method according to claim 15 wherein (b) comprises introducing the effluent gas into a gas reactor comprising an effluent gas inlet adapted to receive the effluent gas exhausted from the substrate processing chamber, an effluent gas outlet, and a path-length in between the effluent gas inlet and effluent gas outlet, and wherein (d) comprises coupling RF or microwave energy to the effluent and oxygen containing gases across the path-length in the gas reactor to maintain a plasma across the path-length.

25. A method according to claim 15 wherein (c) comprises introducing an oxygen containing gas into the reactor.

26. A substrate processing apparatus comprising:
  (i) a substrate processing chamber capable of processing a substrate in an energized gas, the chamber comprising:
    (a) a substrate support;
    (b) a gas supply to provide a gas in the chamber;
    (c) a process gas energizer capable of energizing the gas to process a substrate or clean the chamber, thereby generating an effluent gas; and
    (d) an exhaust tube; and
  (ii) a gas treatment apparatus capable of reducing a hazardous gas content of effluent gas exhausted from the chamber, the gas treatment apparatus comprising:
    (a) a gas reactor having an effluent gas inlet connected to the exhaust tube adapted to receive effluent gas exhausted from the substrate processing chamber, an effluent gas outlet, and a path-length in between the effluent gas inlet and the effluent gas outlet, and an effluent gas energizer adapted to couple energy to the effluent gas across the path-length in the gas reactor to maintain a plasma of the effluent gas across the path-length comprising energized species; and (b) a catalytic reactor comprising catalytic material adapted to catalyze reactions in the energized effluent gas species to reduce the hazardous gas content of the effluent gas.

27. An apparatus according to claim 26 wherein the catalytic reactor is located downstream of the gas reactor.

28. An apparatus according to claim 26 wherein the gas reactor and the catalytic reactor are in a unitary housing.

29. An apparatus according to claim 26 wherein the catalytic material comprises catalytic surfaces that extend at least partially into the gas reactor.

30. An apparatus according to claim 26 wherein the effluent gas energizer is adapted to couple RF energy to the effluent gas.

31. An apparatus according to claim 30 wherein the effluent gas energizer comprises an inductor antenna outside the gas reactor.

32. An apparatus according to claim 30 wherein the effluent gas energizer comprises an inductor antenna inside the gas reactor.

33. An apparatus according to claim 26 wherein the catalytic material comprises catalytic surfaces.

34. An apparatus according to claim 33 wherein the catalytic surfaces are on a ceramic.

35. An apparatus according to claim 33 wherein the catalytic surfaces comprise cordierite, $Al_2O_3$, alumina-silica, silicon carbide, or silicon nitride.

36. An apparatus according to claim 33 wherein the catalytic material is a coating.

37. An apparatus according to claim 36 wherein the coating comprises a metal catalyst.

38. An apparatus according to claim 33 wherein the catalytic surfaces comprise a metal catalyst.

39. An apparatus according to claim 26 wherein the catalytic reactor includes a high surface area structure.

40. An apparatus according to claim 39 wherein the high surface area structure comprises a honeycomb, foam, or packed pellets.

41. An apparatus according to claim 26 wherein the gas reactor comprises a consumable liner.

42. An apparatus according to claim 41 wherein the liner comprises silica.

43. An apparatus according to claim 26 further comprising a source of additive gas.

44. An apparatus according to claim 43 wherein the source of additive gas comprises a source of oxygen-containing gas.

45. An apparatus according to claim 43 wherein the source of additive gas comprises a source of hydrogen-containing gas.

46. An apparatus according to claim 26 wherein the effluent gas energizer is adapted to couple microwave energy to the effluent gas in the gas reactor.

47. A method of performing a process in a substrate processing chamber and treating an effluent gas exhausted from the substrate processing chamber to reduce a hazardous gas content of the effluent gas, the method comprising:

(a) providing an energized gas in the chamber to process a substrate or clean the chamber, thereby generating an effluent gas, and exhausting the effluent gas from the substrate processing chamber;

(b) after (a), introducing the effluent gas into a gas reactor comprising an effluent gas inlet adapted to receive the effluent gas exhausted from the chamber, an effluent gas outlet, and a path-length in between the effluent gas inlet and effluent gas outlet, and coupling energy to the effluent gas across the path-length in the gas reactor to maintain a plasma of the effluent gas across the path-length; and (c) after step (a) and before or after step (b), introducing the effluent gas into a catalytic reactor to catalyze reactions in the effluent gas, thereby reducing a hazardous gas content of the effluent gas.

48. A method according to claim 47 wherein step (b) comprises introducing effluent gas comprising a perfluorocompound.

49. A method according to claim 47 further comprising the step of introducing an additive gas into the gas reactor.

50. A method according to claim 49 comprising introducing and additive gas comprising $H_2O$ into the gas reactor.

51. A method according to claim 47 further comprising the step of introducing an oxygen containing gas into the gas reactor.

52. A method according to claim 51 further comprising the step of introducing a hydrogen containing gas into the gas reactor.

53. A method according to claim 51 comprising introducing an oxygen containing gas comprising one or more of $O_2$, $O_3$ and TEOS into the gas reactor.

54. A method according to claim 47 further comprising the step of introducing a hydrogen containing gas into the gas reactor.

55. A method according to claim 54 comprising introducing a hydrogen containing gas comprising one or more of $H_2$ and $SiH_4$ into the gas reactor.

56. A method according to claim 47 further comprising the step of passing the effluent gas over a consumable material in the reactor.

57. A method according to claim 47 wherein (b) comprises applying RF power to an inductor antenna outside or inside the reactor.

58. A method according to claim 47 comprising coupling energy to the effluent gas across the path-length to form energized effluent gas species, introducing the energized effluent gas species formed in the gas reactor into the catalytic reactor and catalyzing reactions in the energized effluent gas species to reduce a hazardous gas content thereof.

59. A substrate processing apparatus comprising:

(i) a substrate processing chamber capable of processing a substrate in an energized gas, the chamber comprising:

(a) a substrate support;
(b) a gas supply to provide a gas in the chamber;
(c) a process gas energizer capable of energizing the gas to process a substrate or clean the chamber, thereby generating an effluent gas; and
(d) an exhaust tube; and (ii) a gas treatment apparatus capable of reducing a hazardous gas content of effluent gas exhausted from the chamber, the gas treatment apparatus comprising:

(a) a gas reactor comprising an effluent gas inlet connected to the exhaust tube adapted to receive effluent gas exhausted from the substrate processing chamber and an effluent gas outlet;

(b) a source of additive gas comprising $H_2O$, the source of additive gas being adapted to introduce the additive gas into the effluent gas exhausted from the substrate processing chamber; and (c) an effluent gas energizer adapted to couple RF or microwave energy to the effluent and additive gases in the gas reactor to reduce the hazardous gas content of the effluent gas.

60. An apparatus according to claim 59 wherein the additive gas further comprises $O_2$, $O_3$, or TEOS.

61. An apparatus according to claim 59 wherein the additive gas further comprises $H_2$ or $SiH_4$.

62. An apparatus according to claim 59 further comprising a catalytic reactor comprising a catalytic material adapted to catalyze reactions in the effluent gas to reduce a hazardous gas content thereof.

63. An apparatus according to claim 62 wherein the catalytic reactor is located downstream of the gas reactor or wherein the gas reactor and the catalytic reactor are in a unitary housing.

64. An apparatus according to claim 62 wherein the effluent gas energizer is adapted to couple RF or microwave energy to the effluent gas to form energized effluent gas species, and the catalytic reactor is adapted to catalyze reactions in the energized effluent gas species to reduce a hazardous gas content thereof.

65. An apparatus according to claim 59 wherein the gas reactor comprises a consumable material capable of reducing the hazardous gas content of the effluent gas by reacting with the effluent gas.

66. An apparatus according to claim 59 wherein the effluent gas energizer is capable of coupling at least 500 Watts of RF or microwave power.

67. A method of performing a process in a substrate processing chamber and treating an effluent gas exhausted from the substrate processing chamber to reduce a hazardous gas content of the effluent gas, the method comprising the steps of:
(a) providing an energized gas in the chamber to process a substrate or clean the chamber, thereby generating an effluent gas, and exhausting the effluent gas from the substrate processing chamber;
(b) after (a), receiving effluent gas exhausted from the substrate processing chamber in a gas reactor;
(c) after (a), introducing an additive gas comprising $H_2O$ into the effluent gas; and
(d) coupling RF or microwave energy to the effluent and additive gases in the gas reactor,
whereby a hazardous gas content of the effluent gas is reduced.

68. A method according to claim 67 wherein in (c) the additive gas further comprises $O_2$, $O_3$, or TEOS.

69. A method according to claim 67 wherein in (c) the additive gas further comprises $H_2$ or $SiH_4$.

70. A method according to claim 67 further comprising the step of passing the effluent over a catalytic material to catalyze reactions in the effluent gas.

71. A method according to claim 70 comprising coupling RF or microwave energy to the effluent gas in the reactor to form energized effluent gas species, and passing the energized effluent gas species over the catalytic material to reduce a hazardous gas content thereof.

72. A method according to claim 67 further comprising reacting the effluent gas with a consumable material in the gas reactor to reduce the hazardous gas content of the effluent gas.

73. A method according to claim 67 wherein (d) comprises coupling at least 500 Watts of RF or microwave power.

74. A substrate processing apparatus comprising:
(i) a substrate processing chamber capable of processing a substrate in an energized gas, the chamber comprising:
(a) a substrate support;
(b) a gas supply to provide a gas in the chamber;
(c) a process gas energizer capable of energizing the gas to process a substrate or clean the chamber, thereby generating an effluent gas; and
(d) an exhaust tube; and
(ii) a gas treatment apparatus capable of reducing a hazardous gas content of effluent gas exhausted from the chamber, the gas treatment apparatus comprising:
(a) a gas reactor comprising an effluent gas inlet connected to the exhaust tube adapted to receive effluent gas exhausted from the substrate processing chamber and an effluent gas outlet;
(b) a source of additive gas comprising oxygen containing gas;
(c) an effluent gas energizer adapted to couple RF or microwave energy to the effluent and additive gases in the gas reactor to form energized effluent gas species; and
(d) a catalytic reactor comprising catalytic material adapted to catalyze reactions in the energized effluent gas species to reduce the hazardous gas content of the effluent gas.

75. An apparatus according to claim 74 wherein the gas reactor has a path-length between the effluent gas inlet and effluent gas outlet, and wherein the gas energizer is adapted to couple RF or microwave energy to the effluent and additive gases across the path-length in the gas reactor to maintain a plasma across the path-length.

76. An apparatus according to claim 74 wherein the additive gas comprises $H_2O$.

77. An apparatus according to claim 74 wherein the additive gas comprises $O_2$, $O_3$, or TEOS.

78. An apparatus according to claim 74 wherein the additive gas comprises $H_2$ or $SiH_4$.

79. An apparatus according to claim 74 wherein the catalytic reactor is located downstream of the gas reactor or in a unitary housing with the gas reactor.

80. An apparatus according to claim 74 wherein the gas reactor comprises a consumable material capable of reducing the hazardous gas content of the effluent gas by reacting with the effluent gas.

81. An apparatus according to claim 74 wherein the effluent gas energizer is capable of coupling at least 500 Watts of RF or microwave power.

82. A method of performing a process in a substrate processing chamber and treating an effluent gas exhausted from the substrate processing chamber to reduce a hazardous gas content of the effluent gas, the method comprising:
(a) providing an energized gas in the chamber to process a substrate or clean the chamber, thereby generating an effluent gas, and exhausting the effluent gas from the substrate processing chamber;
(b) after (a), receiving the effluent gas exhausted from the substrate processing chamber in a gas reactor and coupling RF or microwave energy to the effluent gas in the gas reactor;
(c) before or after step (b), passing the effluent gas over a catalytic material to catalyze reactions in the effluent gas; and
(d) before, during or after steps (b) or (c), introducing an additive gas comprising oxygen containing gas into the effluent gas,
thereby reducing a hazardous gas content of the effluent gas.

83. A method according to claim 82 wherein the gas reactor comprises an effluent gas inlet adapted to receive effluent gas exhausted from the substrate processing chamber, an effluent gas outlet, and a path-length in between the effluent gas inlet and effluent gas outlet, and wherein (b) comprises coupling RF or microwave energy to the effluent gas across the path-length in the reactor to maintain a plasma across the path-length.

84. A method according to claim 82 wherein the additive gas comprises $H_2O$.

85. A method according to claim 82 wherein the additive gas comprises $O_2$, $O_3$, or TEOS.

86. A method according to claim 82 wherein the additive gas further comprises $H_2$ or $SiH_4$.

87. A method according to claim 82 comprising coupling RF or microwave energy to the effluent gas in the reactor to form energized effluent gas species and passing energized effluent gas species over the catalytic material to reduce a hazardous gas content thereof.

88. A method according to claim 82 further comprising reacting the effluent gas with a consumable material in the gas reactor to reduce a hazardous gas content of the effluent gas.

89. A method according to claim 82 comprising coupling at least 500 Watts of RF or microwave power.

* * * * *